United States Patent
Welle et al.

(10) Patent No.: US 10,145,719 B2
(45) Date of Patent: Dec. 4, 2018

(54) ECHO CURVE DETERMINATION AT A RESOLUTION THAT DIFFERS ON AREA-BY-AREA BASIS

(71) Applicant: VEGA Grieshaber KG, Wolfach (DE)

(72) Inventors: Roland Welle, Hausach (DE); Karl Griessbaum, Muehlenbach (DE); Michael Fischer, Alpirsbach (DE)

(73) Assignee: VEGA GRIESHABER KG, Wolfach (DE)

( * ) Notice: Subject to any disclaimer, the term of this patent is extended or adjusted under 35 U.S.C. 154(b) by 336 days.

(21) Appl. No.: 14/779,732

(22) PCT Filed: Mar. 27, 2014

(86) PCT No.: PCT/EP2014/056141
§ 371 (c)(1),
(2) Date: Sep. 24, 2015

(87) PCT Pub. No.: WO2014/166747
PCT Pub. Date: Oct. 16, 2014

(65) Prior Publication Data
US 2016/0054166 A1 Feb. 25, 2016

(30) Foreign Application Priority Data
Apr. 10, 2013 (EP) .................... 13163150

(51) Int. Cl.
G01F 23/28 (2006.01)
(52) U.S. Cl.
CPC .................. G01F 23/282 (2013.01)

(58) Field of Classification Search
CPC .................................................. G01F 23/282
See application file for complete search history.

(56) References Cited

U.S. PATENT DOCUMENTS

| 5,504,490 A | 4/1996 | Brendle et al. |
|---|---|---|
| 7,639,177 B2 | 12/2009 | Welle et al. |
| 8,843,329 B2 | 9/2014 | Griessbaum et al. |
| 2009/0278730 A1* | 11/2009 | Taylor .................. G01F 23/284 342/124 |

(Continued)

FOREIGN PATENT DOCUMENTS

| CN | 101384886 | 3/2009 |
|---|---|---|
| CN | 101825486 | 9/2010 |

(Continued)

OTHER PUBLICATIONS

Wang et al, "Application of Wavelet Transform in Signal Processing of Radar Material Level Meter", Process Automation Instrumentation, vol. 32, No. 2, Feb. 2011, pp. 23-25.

(Continued)

*Primary Examiner* — Manuel A Rivera Vargas
(74) *Attorney, Agent, or Firm* — Fay Kaplun & Marcin, LLP

(57) ABSTRACT

To determine an echo curve using a fill level measurement device operating according to the FMCW principle, the echo curve is calculated from corresponding sampling values at a first resolution. After this, a particular portion of the echo curve is calculated at a second, higher resolution using the DTFT algorithm. This can reduce the complexity required for calculating the echo curve.

10 Claims, 4 Drawing Sheets

(56) References Cited

U.S. PATENT DOCUMENTS

2010/0223019 A1    9/2010    Griessbaum et al.

FOREIGN PATENT DOCUMENTS

| EP | 0 676 649 | 10/1995 |
| EP | 1 933 117 | 6/2008 |
| EP | 2 116 819 | 11/2009 |
| EP | 2 226 615 | 9/2010 |
| EP | 2 302 408 | 2/2013 |

OTHER PUBLICATIONS

An, "Study on Algorithm of the DSP based FMCW Radar Material Level Measuring Instrument", Chinese Master's Thesis Full-text Database, Science and Technology, Issue 10, 2010, pp. 6-33.

\* cited by examiner

ECHO CURVE DETERMINATION AT A RESOLUTION THAT DIFFERS ON AREA-BY-AREA BASIS

PRIORITY CLAIM

This application is a National Phase Application of PCT Patent Application Serial No. PCT/EP2014/056141 filed on Mar. 27, 2014 which claims the benefit of the filing date of EP Patent Application Serial No. 13 163 250.9 filed on Apr. 10, 2013, the disclosure of both applications is hereby incorporated herein by reference.

FIELD OF THE INVENTION

The invention relates to the determination of echo curves. More particularly, the invention relates to a method for determining an echo curve using a fill level measurement device which operates according to a distance measurement method and carries out a spectral analysis of the measurement signal, received thereby, during the fill level determination, and relates to a high-resolution fill level measurement device, to a program element and to a computer-readable medium.

BACKGROUND

The fill level measurement devices on which the invention is based operate according to a distance measurement method, in which a spectral analysis of the received measurement signal is performed.

These can be, for example, fill level measurement devices which operate according to the frequency-modulated continuous wave principle (FMCW). Other suitable fill level measurement devices operate according to the stepped frequency continuous wave principle (SFCW) or other distance measurement methods which require a spectral analysis during the signal evaluation.

Particularly suitable are fill level measurement devices which operate according to the free-radiating radar principle, the guided microwave principle or an ultrasonic measurement method, or also by means of a laser beam. Fill level measurement devices of this type can, for example, be connected to a 4 . . . 20 mA supply.

The fill level measurement devices emit a transmission signal towards the filling material surface. This signal is then reflected by the filling material surface and possibly by the container base, a separation layer between various filling media or by imperfections in the container, and is picked up by the fill level measurement device.

The reflected and picked up transmission signal (also referred to in the following as the received signal or measurement signal) then undergoes signal processing, in which the fill level is determined from this signal.

During this signal processing, the generally wave-like received signal can be sampled and what is known as the envelope (also referred to as the echo curve in the following) can be calculated from the sampling values. This envelope or echo curve can then be evaluated further.

It is thus possible, for example, to identify a local maximum (referred to in the following as an echo) in the echo curve and to identify this echo as the portion of the transmission signal that has been reflected at the filling material surface. In this case, the position of this echo in the echo curve thus corresponds to the actual, local position of the filling material surface in the container.

SUMMARY OF THE INVENTION

The present invention relates to an envelope calculation by means of a fill level measurement device which operates according to a distance measurement method and carries out a spectral analysis of the measurement signal, received thereby, during the fill level determination, which calculation allows the fill level to be determined as accurately as possible in as simple a manner as possible.

This object is achieved by the features of the independent claims. Developments of the invention are set out in the dependent claims and in the following description.

According to a first aspect of the invention, a method is disclosed for determining an echo curve using a fill level measurement device which operates according to a distance measurement method and carries out a spectral analysis of the measurement signal, received thereby, during the fill level determination. In the method, a measurement signal is first detected, which is a transmission signal transmitted by the fill level measurement device and reflected at least at the surface of a medium (i.e. in particular at the filling material surface). After this, the detected transmission signal is converted into an intermediate frequency signal which is sampled at discrete times. The sampling values obtained by sampling the intermediate frequency signal are transformed from the time range into the frequency range, optionally after having been digitised. The sampling values transformed into the frequency range are then used to form an echo curve at a first resolution. Following this or at the same time, a portion of the echo curve within a defined region of the echo curve is calculated at a second resolution that is higher than the first resolution.

In other words, different portions of the echo curve are calculated at different resolutions. It is thus possible for the portion of the echo curve of greater interest to be purposefully calculated at a higher resolution. For example, this can be the region that includes the filling material echo.

It is also possible for a plurality of portions of the echo curve to be calculated at a higher resolution, for example all the portions that comprise an echo. It should be mentioned at this point that in principle, the echo curve can comprise a plurality of echoes, of which, however, only one can be attributed to a direct reflection of the transmission signal at the filling material surface. The other echoes can, for example, be echoes due to multiple reflections or due to reflections at internal fittings of the container, at the container base, at a separation layer or at imperfections.

The echo curve is calculated at the first resolution from the sampling values obtained from the sampling, for example by using a fast Fourier transform (FFT), which transforms the sampling values into the frequency range and calculates the sampling points on the echo curve in the frequency range. In this regard, the fast Fourier transform uses all the sampling values obtained by the sampling to calculate the echo curve at the rough, first resolution.

If the portion of the echo curve in which the echo of interest is located, for example the filling material echo, was then identified from this echo curve at the first resolution, additional sampling points on the echo curve in this portion of the echo curve are calculated at the second resolution, which is higher than the first resolution, and specifically by using a discrete-time Fourier transform (DTFT). In this respect, the discrete-time Fourier transform also uses all the sampling values obtained by the sampling.

"Resolution" should be understood here as the spacing between adjacent sampling points in the frequency range. At the lower, first resolution, this spacing is thus greater than at the higher, second resolution.

In other words, sampling points on the echo curve are thus calculated, from the sampling values obtained by the sampling, at the first resolution using a fast Fourier transform, after which additional sampling points on the echo curve in the portion of the echo curve are calculated, also from said sampling values, at the second resolution using a discrete-time Fourier transform.

There is no need for zero padding. Owing to the (subsequent) use of a discrete-time Fourier transform, any number of additional sampling points can be (subsequently) calculated on the echo curve. It can thus also be provided for individual additional intermediate values for the echo curve to be calculated using the discrete-time Fourier transform (DTFT). These intermediate values do not have to be equidistant. The calculation can thus be made less complex.

According to an embodiment of the invention, the regions of the echo curve in which the echo curve portions are to be calculated at the higher resolution can be automatically identified and defined by the fill level measurement device. In this way, by analysing the initially roughly resolved echo curve, the fill level measurement device can establish the location of local maxima and select one or more of these maxima in order to calculate, at a higher resolution, a portion of the echo curve around this maximum. The length of this portion can also be determined automatically.

It can also be provided for a user himself to define the defined region of the echo curve in which the portion to be calculated at the higher resolution is located. In particular, it can be provided for the user to define the number of portions of the echo curve that are to be calculated at the higher resolution. For example, it can be provided for the user to specify that he is only interested in the fill level echo and the echo from the container base. These two echoes are then identified in the roughly resolved echo curve and then in the following step, the two echo curve portions, in which said two echoes are located, are calculated at the higher resolution.

The roughly resolved echo curve can, for example, be calculated with the aid of a digital signal processor of the fill level measurement device. The portion of the echo curve within the defined region of the echo curve can be calculated at a very highly rasterised resolution.

According to one embodiment of the invention, the transmission signal is a frequency-modulated signal, an electromagnetic signal or an optical signal.

According to a further embodiment of the invention, the fill level measurement device operates according to the FMCW principle. Said device can also be designed to operate according to the SFCW principle.

According to a further embodiment of the invention, the portion of the echo curve located within the defined region of the echo curve is calculated at the second, greater resolution using a discrete-time Fourier transform (DTFT).

The discrete-time Fourier transform for time-discrete signals (DTFT) forms a continuous, time-discrete signal on a (theoretically) continuous frequency spectrum. Therefore, the calculation rule allows the value of any predeterminable frequency in the continuous frequency spectrum to be determined using the digital sampling points of the intermediate frequency signal which are obtained by sampling. Repeatedly executing the calculation rule therefore allows a plurality of sampling points, which in particular also have an arbitrarily small frequency difference in relation to the neighbouring sampling points, to be determined in the frequency range. An echo curve portion can thus be determined in the frequency range at a very accurate resolution.

According to a further aspect of the invention, the portion of the echo curve located within the defined region is calculated by calculating additional sampling points on the echo curve in the defined region.

These additional sampling points are each at, for example, a predetermined frequency spacing of $\Delta f$ from the sampling points adjacent thereto. It can also be provided for the frequency spacing between the sampling points to vary along the portion, for example said spacing is smaller in the centre of the portion than in the edge regions thereof.

According to a further embodiment of the invention, the defined region of the echo curve corresponds to the location of an echo corresponding to the surface of the medium, more particularly the fill level echo, which corresponds to the location of the filling material surface.

According to a further embodiment of the invention, the defined region has exactly three sampling values, the middle value of the three sampling values having a greater amplitude than the two other sampling values.

The defined region can also have four, five or more sampling values, depending on how wide it is intended to be.

The number of sampling values belonging to the defined region can, for example, depend on how great their amplitudes are in relation to the amplitudes of sampling values of other regions of the echo curve. For example, it is possible for a wide echo which extends over more than three sampling values to also be calculated in high resolution over a relatively large region, whereas a narrow echo results in the defined region being narrower.

According to a further embodiment of the invention, the echo curve is calculated at the first resolution from the sampling values determined in the time range, using a fast Fourier transform.

According to a further aspect of the invention, a high-resolution fill level measurement device is disclosed which operates according to a distance measurement method and carries out a spectral analysis of the measurement signal during the fill level determination. The high-resolution fill level measurement device comprises an antenna for detecting a transmission signal (measurement signal) transmitted by the fill level measurement device and reflected at least at the surface of a medium. A high-frequency unit for converting the detected transmission signal into an intermediate frequency signal is also provided, along with a sampling unit for sampling the intermediate frequency signal at discrete times.

Furthermore, the fill level measurement device comprises an echo curve generation unit which can transform the sampling values obtained by the sampling from the time range into the frequency range, and can calculate, at a first resolution, an echo curve from the sampling values transformed into the frequency range and calculate a portion of the echo curve within a defined region of the echo curve at a second resolution which is higher than the first resolution.

The high-resolution fill level measurement device can in particular be a fill level measurement device that operates according to the FMCW principle. More particularly, the fill level measurement device can be designed to carry out a method described above and in the following.

According to a further aspect of the invention, a program element is disclosed which, when executed on a processor of a fill level measurement device, causes the processor to carry out the method described above and in the following.

According to a further aspect of the invention, a computer-readable medium is disclosed, on which a program element is stored, which, when executed on the processor of a fill level measurement device, causes the fill level measurement device to carry out the method described above and in the following.

The program element can be part of a piece of software which is stored on a processor of a fill level measurement device. In this case, the processor can likewise be the subject matter of the invention. In addition, the invention comprises a program element, which right from the outset uses the invention, and a program element which, by means of an update, causes an existing program element to use the invention.

Embodiments of the invention will be described below with reference to the drawings.

DETAILED DESCRIPTION OF EMBODIMENTS

Figure 1:
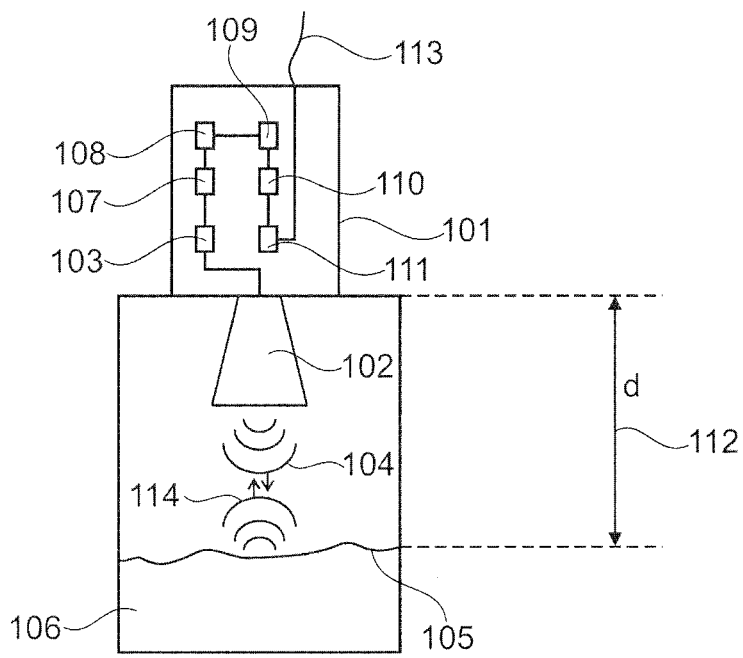
FIG. 1 shows a fill level measurement device installed in a container.

The drawings are schematic and not to scale. In the following description of the drawings, where like reference numerals are used in different figures, they denote like or similar elements. However, like or similar elements may also be denoted by different reference numerals.

FIG. 1 shows a fill level measurement device 101 in the form of a fill level radar, which is installed in or on a container.

It should be mentioned at this point that the method described below can also be carried out by other fill level measurement devices which run a spectral analysis during the signal evaluation, for example fill level measurement devices which operate according to the guided microwave principle, or ultrasonic measurement devices or laser measurement devices.

The fill level measurement device in FIG. 1 is, for example, an FMCW radar device. Particular importance is given to the FMCW fill level measurement method owing to the integrated high-frequency components which are now available for fill level measurements in the W band (from 75 GHz to 110 GHz). However, said method can also be used in all other frequency bands.

Via the antenna 102, the fill level measurement device 101 emits, towards a filling material surface 105, a frequency-modulated transmission signal 104 which has been generated by the high-frequency unit 103. The transmission signal is reflected at the surface 105 of the medium 106 and then spreads out towards the fill level measurement device 101, where it is received again by the antenna 102 and forwarded to the high-frequency unit 103.

Using the signal currently being transmitted, the received signal is converted in the high-frequency unit 103 into an intermediate frequency signal, which substantially still only comprises low-frequency signal portions.

Figure 2A:
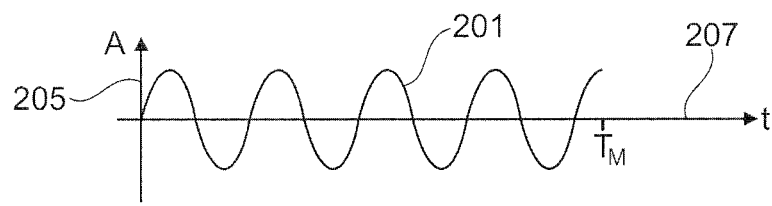
FIG. 2A shows an intermediate frequency signal (beat signal) in the time range, which signal can be attributed to a reflected transmission signal received by a fill level measurement device.

By way of example, FIG. 2A shows an intermediate frequency signal or beat signal 201 which has been generated by the fill level measurement device 101 from the received, reflected transmission signal (measurement signal) and the emitted transmission signal, the amplitude 205 of which beat signal is mapped as a function of the signal transit time t 207.

The intermediate frequency signal 201 is provided continuously by the high-frequency unit 103 (cf. FIG. 1) during a measurement cycle of length $T_M$.

An A/D converter 107 connected to the high-frequency unit 103 samples the provided intermediate frequency signal 201 during a measurement cycle and stores the resultant digitised amplitude values of the intermediate frequency signal 201 in a memory, which is not shown here but is contained in the fill level measurement device 101.

Once the actual measurement cycle has finished, an echo curve generation unit 108 calculates an echo curve from the stored amplitude values for the intermediate frequency signal. Depending on the method, it may be expedient to, in this step, transform the intermediate frequency signal from the time range into the frequency range.

Figure 2B:
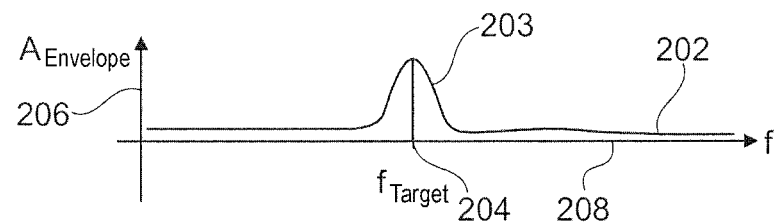
FIG. 2B shows the intermediate frequency signal of FIG. 2A following the conversion thereof into the frequency range.

The curve 202 in FIG. 2B shows the result of converting the intermediate frequency signal 201 into the frequency range. Here, the amplitude 206 of the signal 202 is plotted as a function of the frequency f 208.

In a further step, the echo curve 202 thus obtained is forwarded to an evaluation unit 109 (cf. FIG. 1) which, in accordance with known methods, identifies the echo 203 that is highly likely to correspond to the reflection at the filling material surface 105, and passes said echo on to a measurement unit 110.

Using the rough frequency location of both the useful echo 203 and the echo curve 202, the measuring unit 110 determines the exact frequency that can be assigned to the echo pulse 203. Known methods are again used in this step. On one hand, the position of the maximum of the echo pulse 203 can be determined ($f_{Target}$ 204). Furthermore, it may also be possible to select another measurement point, for example the point on the rising echo flank that has an amplitude difference of exactly −3 dB compared with the maximum of the echo pulse 203.

The frequency value 204 determined thus can be transformed into a distance value 112 using known equations.

This distance value d is optionally then linearised and scaled in an output unit 111 of the fill level measurement device 101, and then provided to the outside on a suitable interface 113 digitally via a HART line, a profibus, a foundation fieldbus (FF), the Ethernet, a USB interface and/or even in analogue form via a 4 . . . mA loop.

Figure 3A:
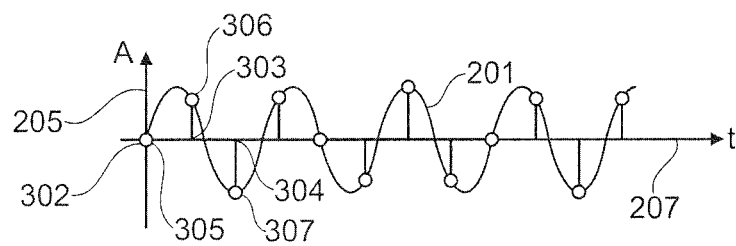
FIG. 3A shows the sampling of an intermediate frequency signal in the time range.

The relationship shown in FIG. 2B shows an ideal situation that can only be achieved approximately when the signals are processed digitally. FIG. 3A illustrates the problems with digital signal processing.

The time-continuous beat signal 201 which is provided by the high-frequency unit 103 and has the length $T_M$ is only detected at certain times 302, 303, 304, etc. owing to the samples in the A/D converter 107.

In FIG. 3A, the values determined in the process are marked by corresponding circles 305, 306, 307, etc.

Figure 3B:
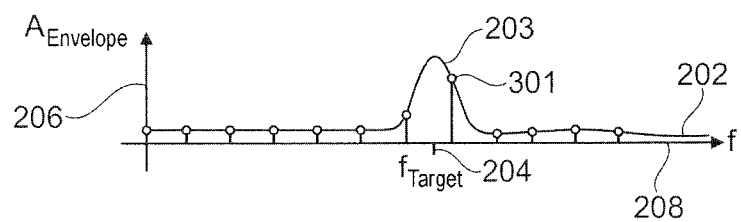
FIG. 3B shows the signal of FIG. 3A following the conversion thereof into the frequency range.

These values are converted into the frequency range by using, for example, a fast Fourier transform (FFT). The values determined therefrom are shown in FIG. 3B.

The computed values have a frequency spacing of $1/T_M$. The frequency-continuous spectrum 202 of the beat signal 201 is calculated by the fast Fourier transform only for individual frequency values (see the circle marks in FIG. 3B).

During processing of the signal propagation cycle in the measurement device 101, a false value 301 is now determined for the maximum of the useful echo 203, the result of which is a relatively large measurement error owing to the difference between the associated frequency value and the actual target frequency 204.

To prevent this, zero padding can be used. In the process, prior to the calculation of the fast Fourier transform, additional sampling values having an amplitude value of 0 are computationally appended to the actual beat signal. Following the FFT, additional calculated sampling points on the echo curve 202 are thus produced.

For example, up to 4096 real sampling values (or even more) of the beat signal can thus be detected. Therefore, to calculate three additional intermediate values, 3 times 4096 zeros would have to be appended to the signal. The transformation of 4096 values thus results in a transformation of 16384 values, which firstly places great demands on the size of the memory in the fill level measurement device and secondly can also lead to very long calculation times and, as a result, high levels of energy consumption.

When even greater demands are placed on the accuracy of the echo curve, the complexity increases just as sharply.

Alternatively to zero padding, a method can be carried out which allows for any number of sampling points on the spectrum 202 of the intermediate frequency signal 301 to be determined, without excessively increasing the demands on the memory space required therefor in the process.

Applying this method in the field of energy-optimised two-wire measurement devices is particularly advantageous.

Figure 4:
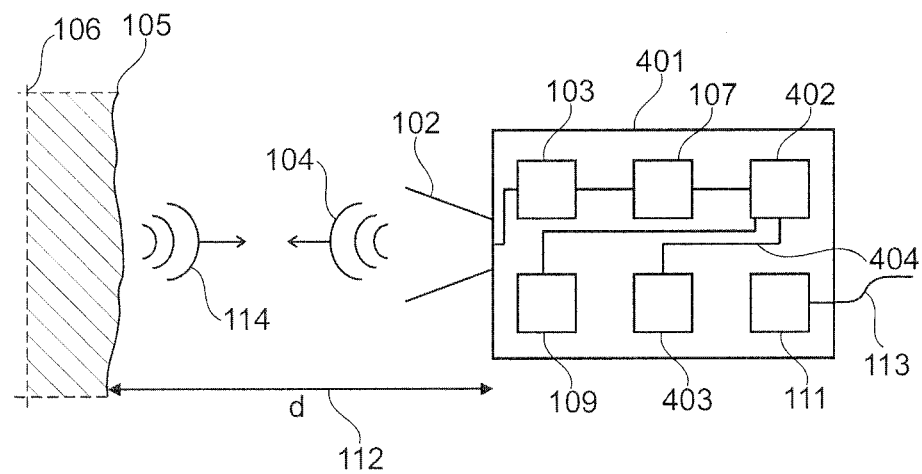
FIG. 4 shows a fill level measurement device according to an embodiment of the invention.

FIG. 4 shows a fill level measurement device 401 which has been modified with respect to FIG. 1. This fill level measurement device differs from the fill level measurement device in FIG. 1 on account of a modified echo curve generation unit 402 and a modified measurement unit 403, which are interconnected via the data line 404.

It should be noted at this point that the different signal processing units that the fill level measurement device 401 comprises can also be integrated in one single unit.

Figure 5:
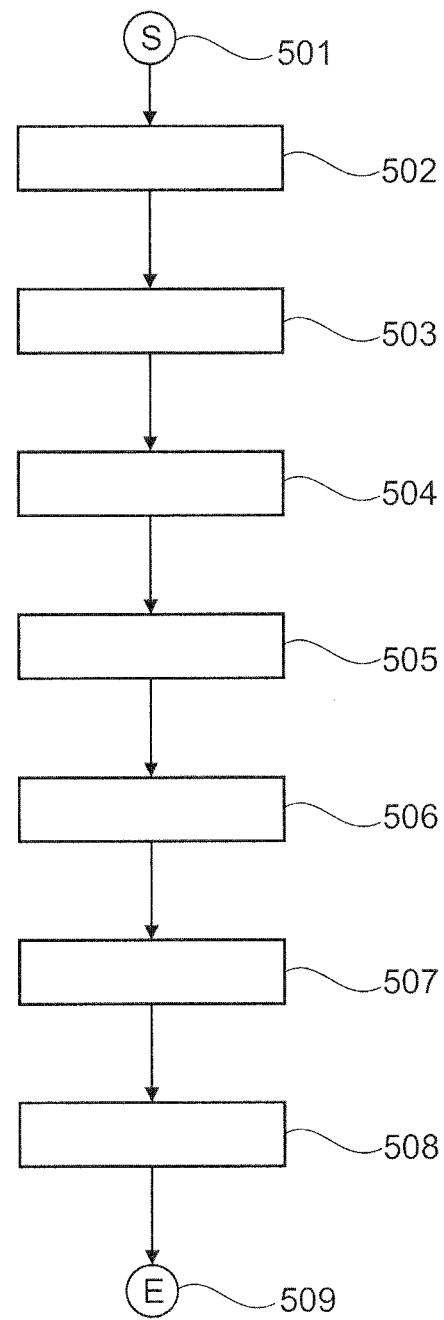
FIG. 5 shows a flow diagram of a method according to an embodiment of the invention.

By way of example, FIG. 5 shows a sequence as can be carried out in a fill level measurement device 401 according to an embodiment of the invention.

Figure 6:
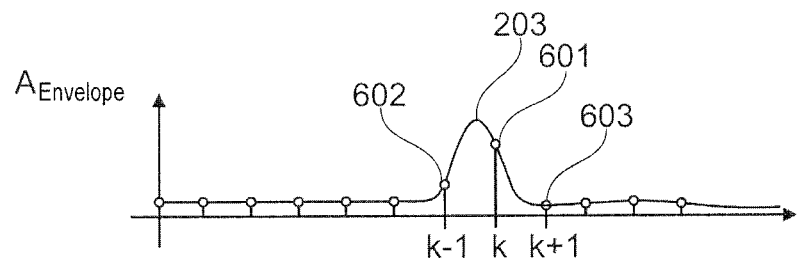
FIG. 6 shows sampling values of an echo curve in the frequency range.
Figure 7:
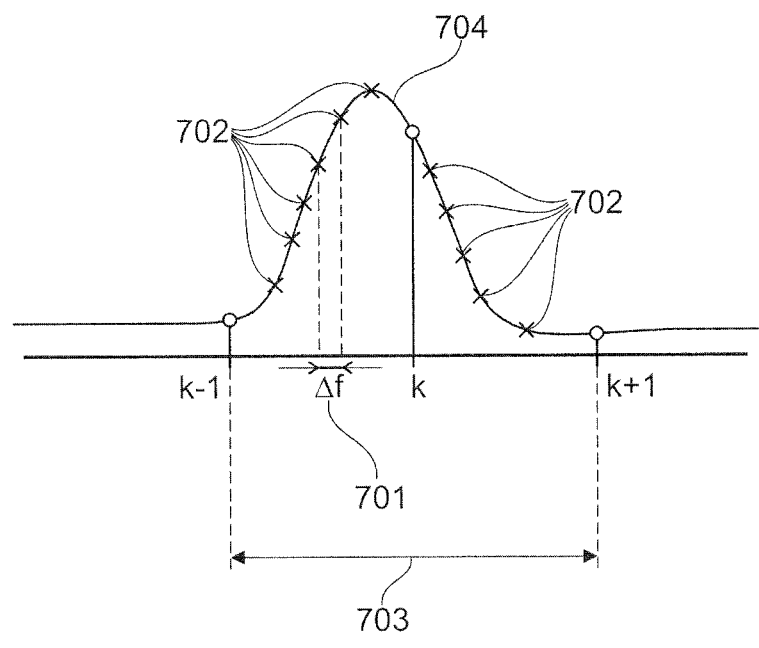
FIG. 7 shows the calculation of additional sampling points on the echo curve of FIG. 6 within a defined region of the echo curve according to an embodiment of the invention.

FIGS. 6 and 7 also illustrate important intermediate results from the method described below.

The method starts in the start state 501 (cf. FIG. 5). As with a conventional fill level measurement device, in step 502 a beat curve is firstly generated, digitised and stored in the memory of the fill level measurement device 401.

In the optional step 503, the beat signal, which is in digital form, is weighted with a known window function, e.g. a Hamming window, a Bartlett window or another window. The use of window functions can improve the display in the spectral range.

In step 504, the beat signal of the modified echo curve generation unit 402 (cf. FIG. 4) is converted into the spectral range using the fast Fourier transform. In this respect, the hardware configuration of the fill level measurement device 401 may be capable of doing this in a specific way, for example by using a digital signal processor having a specific hardware unit for calculating an FFT.

In step 505, the location of the echo 203 corresponding to the filling material surface is determined according to known methods. The location of the echo can, for example, be defined by the frequency of the highest value 601 in the spectral range. In step 506, the modified measurement unit 403 determines the frequency values of the adjacent two, three, four or more sampling values 602, 603 of the previously identified sampling value 601 having the greatest amplitude. It is assumed that these sampling values are the sampling values for the filling material echo 203.

These frequency values are communicated to the modified echo curve generation unit 402 of the fill level measurement device in FIG. 4, which unit then calculates additional sampling points 702 on the echo curve 202 in the region of the filling material echo 203 in a predeterminable frequency grid 701 (cf. FIG. 7) and communicates these to the modified measurement unit 403.

The portion 704 of the echo curve within the defined region 703 can then be calculated at a higher resolution from these additional sampling points 702.

The method used for this purpose is known as a discrete-time Fourier transform (DTFT). The results of this calculation agree with those of the fast Fourier transform in conjunction with zero padding. Since it is necessary to append zeros for said fast Fourier transform, the storage space required therefor is much greater but can be very limited, especially in commercially available, energy-optimised digital signal processor solutions.

In step 507, in accordance with known methods, the measurement unit 403 determines the distance 112 from the filling material surface 105 (cf. FIG. 4) using the sampling points 702 which have been additionally computed. The method finishes once the measurement value 508 has been output.

For the sake of completeness, it should be noted that "comprising" and "having" do not exclude the possibility of other elements or steps, and "one" or "a" does not exclude the possibility of a plurality. It should further be noted that features or steps which have been described with reference to one of the above embodiments may also be used in combination with other features or steps of other above-described embodiments. Reference numerals in the claims should not be treated as limiting.

The invention claimed is:

1. A method for determining an echo curve using a fill level measurement device which operates according to a distance measurement method and carries out a spectral analysis of a measurement signal, which has been received by the fill level measurement device during the fill level determination, comprising the steps of:

detecting the measurement signal, which is a transmission signal transmitted by the fill level measurement device and reflected at least at the surface of a medium;

converting the detected transmission signal into an intermediate frequency signal;

sampling the intermediate frequency signal at discrete times, resulting in sampling values;

transforming the sampling values, obtained by the sampling, from a time range into a frequency range and calculating first points of an echo curve from the sampling values at a first spacing, and using the calculated first points to form the echo curve;

calculating second, additional points on a portion of the echo curve within a defined region of the echo curve at a second spacing which is smaller than the first spacing, and using the calculated second, additional points to form a portion of the echo curve;

determining a distance value from the surface of the medium using the second, additional points; and providing the distance value to an external interface of the fill level measurement device.

2. The method according to claim 1, wherein the sampling values obtained by the sampling are transformed from the time range into the frequency range and the second, additional sampling points on the portion of the echo curve are calculated using a discrete-time Fourier transform (DTFT).

3. The method according to claim 2, wherein the second, additional sampling points are each at a predetermined frequency spacing $\Delta f$ from the sampling points adjacent thereto.

4. The method according to claim 1, wherein the transmission signal is a frequency-modulated signal, an electromagnetic signal or an optical signal.

5. The method according to claim 1, wherein the fill level measurement device operates according to a Frequency-Modulated Continuous Wave ("FMCW") principle.

6. The method according to claim 1, wherein the portion of the echo curve corresponds to the location of an echo corresponding to the surface of the medium.

7. The method according to claim 1, wherein the first sampling points on the echo curve are calculated from the sampling values at the first spacing using a fast Fourier transform (FFT).

8. A program element which, when executed on a processor of a fill level measurement device, causes the processor to carry out steps of a method according to claim 1.

9. A non-transitory computer-readable medium, on which a program element is stored which, when executed on a processor of a fill-level measurement device, causes the processor to carry out steps of a method according to claim 1.

10. A high-resolution fill level measurement device which operates according to a distance measurement method and carries out a spectral analysis of a measurement signal, which has been received by the device during the fill level determination, comprising:

an antenna configured to detect a measurement signal, which is a transmission signal transmitted by the device and reflected at least at the surface of a medium;

a high-frequency unit configured to convert the detected transmission signal into an intermediate frequency signal;

an external interface;

a sampling unit configured to sample the intermediate frequency signal at discrete times resulting in sampling values;

a processor; and a non-transitory computer-readable storage medium on which a program element is stored which, when executed by a processor, causes the fill level measurement device to:

calculate first points from the sampling values at a first spacing, and using the calculated points to form an echo curve;

calculate second, additional points from the sampling values at a second spacing which is smaller than the first spacing, and using the calculated second, additional points to form a portion of the echo curve;

determine a distance value from the surface of the medium using the second, additional points; and providing the distance value to the external interface of the fill level measurement device.

* * * * *